(12) United States Patent
Welten

(10) Patent No.: US 10,045,408 B2
(45) Date of Patent: Aug. 7, 2018

(54) CONTROL UNIT FOR A LED ASSEMBLY AND LIGHTING SYSTEM

(71) Applicant: ELDOLAB HOLDING B.V., Son en Breugel (NL)

(72) Inventor: Petrus Johannes Maria Welten, NC Oss (NL)

(73) Assignee: ELDOLAB HOLDING B.V., Son en Breugel (NL)

( * ) Notice: Subject to any disclaimer, the term of this patent is extended or adjusted under 35 U.S.C. 154(b) by 0 days.

(21) Appl. No.: 15/697,807

(22) Filed: Sep. 7, 2017

(65) Prior Publication Data

US 2017/0367159 A1 Dec. 21, 2017

Related U.S. Application Data

(60) Division of application No. 14/872,435, filed on Oct. 1, 2015, now Pat. No. 9,820,347, which is a continuation of application No. 13/001,534, filed as application No. PCT/NL2009/000138 on Jun. 23, 2009, now Pat. No. 9,173,262.

(60) Provisional application No. 61/175,242, filed on May 4, 2009, provisional application No. 61/075,212, filed on Jun. 24, 2008.

(51) Int. Cl.
*H05B 33/00* (2006.01)
*H05B 33/08* (2006.01)

(52) U.S. Cl.
CPC ....... *H05B 33/0827* (2013.01); *H05B 33/083* (2013.01); *H05B 33/0818* (2013.01); *H05B 33/0851* (2013.01); *H05B 33/0866* (2013.01)

(58) Field of Classification Search
CPC ............ H05B 33/0815; H05B 33/0827; H05B 33/0851; H05B 33/0818; H05B 33/0857
See application file for complete search history.

(56) References Cited

U.S. PATENT DOCUMENTS

| 4,529,949 A | 7/1985 | De Wit et al. |
|---|---|---|
| 5,912,568 A | 6/1999 | Kiley |
| 6,362,835 B1 | 3/2002 | Urbanus et al. |

(Continued)

FOREIGN PATENT DOCUMENTS

| JP | 2008130907 A | 6/2008 |
|---|---|---|
| WO | WO 2006/107199 A2 | 10/2006 |

(Continued)

*Primary Examiner* — Monica C King
(74) *Attorney, Agent, or Firm* — Browdy and Neimark, P.L.L.C.

(57) ABSTRACT

A control unit for an LED assembly comprising a first and second LED unit, said LED units being serial connected is described. The LED assembly, in use, is powered by a switched mode power supply. The control unit being arranged to receive an input signal representing a desired output characteristic of the LED assembly, determine a first and second duty cycle for respective LED units associated with a nominal current of the switched mode power supply, for providing the desired output characteristic, determine the largest of the first and second duty cycles for respective LED units, determine a reduced current based on at least the largest of the duty cycles, adjust the first and second duty cycle for respective LED units based on the reduced current, provide an output signal for the LED assembly and the switched mode power supply based on the adjusted first and second duty cycles and the reduced current for obtaining the desired characteristic.

10 Claims, 17 Drawing Sheets

(56) References Cited

U.S. PATENT DOCUMENTS

| | | |
|---|---|---|
| 6,683,419 B2 | 1/2004 | Kriparos |
| 7,202,608 B2 | 4/2007 | Robinson et al. |
| 7,358,681 B2 | 4/2008 | Robinson et al. |
| 7,420,335 B2 | 9/2008 | Robinson et al. |
| 7,456,584 B2 | 11/2008 | Itoh |
| 7,460,103 B2 | 12/2008 | Konno et al. |
| 7,477,228 B2 | 1/2009 | Wyatt |
| 7,541,750 B2 | 6/2009 | Shen et al. |
| 7,671,575 B1 | 3/2010 | Suzuki et al. |
| 7,710,049 B2 | 5/2010 | Zhao et al. |
| 7,723,926 B2 | 5/2010 | Mednik et al. |
| 7,738,002 B2 | 6/2010 | Ashdown et al. |
| 7,791,584 B2 | 9/2010 | Korcharz |
| 7,855,515 B2 | 12/2010 | Huang et al. |
| 7,880,400 B2 | 2/2011 | Zhou et al. |
| 7,902,771 B2 | 3/2011 | Shteynberg |
| 7,903,082 B2 | 3/2011 | Sakurai |
| 7,923,943 B2 | 4/2011 | Peker |
| 7,969,430 B2 | 6/2011 | Korcharz |
| 8,026,894 B2 | 9/2011 | Feng |
| 8,067,896 B2 | 11/2011 | Shteynberg et al. |
| 8,203,283 B2 | 6/2012 | Hoogzaad |
| 8,207,931 B2 | 6/2012 | Peng et al. |
| 8,344,633 B2 | 1/2013 | Van Woudenberg et al. |
| 8,410,727 B2 | 4/2013 | Mizuno |
| 8,587,217 B2 | 11/2013 | Melanson |
| 8,710,757 B2 | 4/2014 | Welten |
| 8,791,645 B2 | 7/2014 | Saccomanno |
| 8,810,160 B2 | 8/2014 | Hoogzaad et al. |
| 9,078,318 B2 | 7/2015 | Hoogzaad et al. |
| 9,173,262 B2 | 10/2015 | Welten et al. |
| 9,351,365 B2 | 5/2016 | Saes et al. |
| 2006/0038803 A1 | 2/2006 | Miller et al. |
| 2006/0039160 A1 | 2/2006 | Cassarly et al. |
| 2007/0159421 A1 | 7/2007 | Peker et al. |
| 2007/0188425 A1 | 8/2007 | Saccomanno |
| 2007/0195025 A1 | 8/2007 | Korcharz et al. |
| 2007/0216615 A1 | 9/2007 | Itoh |
| 2007/0222743 A1 | 9/2007 | Hirakata |
| 2007/0267241 A1 | 11/2007 | Ball |
| 2008/0116818 A1 | 5/2008 | Shteynberg et al. |
| 2008/0297067 A1 | 12/2008 | Wang et al. |
| 2009/0134817 A1 | 5/2009 | Jurngwirth et al. |
| 2010/0148703 A1 | 6/2010 | Mizuno |
| 2011/0109247 A1 | 5/2011 | Hoogzaad et al. |
| 2012/0104974 A1 | 5/2012 | Saes et al. |

FOREIGN PATENT DOCUMENTS

| | | |
|---|---|---|
| WO | 2007141741 A1 | 12/2007 |
| WO | WO 2009029553 A2 | 3/2009 |

CONTROL UNIT FOR A LED ASSEMBLY AND LIGHTING SYSTEM

TECHNICAL FIELD

The present invention relates to lighting systems using Light Emitting Diodes.

BACKGROUND ART

At present, in architectural and entertainment lighting applications more and more solid state lighting based on Light Emitting Diodes (LED) is used. LED's or LED units have several advantages over incandescent lighting, such as higher power to light conversion efficiency, faster and more precise lighting intensity and color control. In order to achieve this precise control of intensity and color from very dim to very bright light output, it is necessary to have accurate control of the forward current flowing through the LED's.

In order to provide said forward current through the LED or LED's, a converter (or a regulator such as a linear regulator) can be used. Examples of such converters are Buck, Boost or Buck-Boost converters. Such converters are also referred to as switch mode power sources. Such power sources enable the provision of a substantially constant current to the LED unit. When such an LED unit comprises LED's of different color, the resulting color provided by the LED unit can be modified by changing the intensity of the different LED's of the unit. This is, in general, done by changing the duty cycles of the different LED's. Operating the LED's at a duty cycle less than 100%, can be achieved by selectively (over time) providing a current to the LED's, i.e. providing the LED's with current pulses rather than with a continuous current. As more and more conventional lighting systems such as halogen lighting or light bulbs are replaced by lighting systems using Light Emitting Diodes, it is important to operate such a lighting system efficiently in order to minimize the power consumption associated with it. In general, a lighting system is applied to operate over a range of illumination (or lighting) conditions (e.g. the brightness of lighting system may be set within a certain range), By merely considering the efficiency of the lighting system at e.g. a nominal operating point rather than over the entire operating range or part of the operating range, the power losses of known lighting systems may be important when operating under certain conditions (e.g. a reduced brightness compared to a nominal brightness).

It is therefore an object of a first aspect of the present invention to improve the efficiency of a lighting system using LEDs.

It has been described to drive a plurality of LED's by means of time based modulation techniques, such as pulse width modulation, duty cycle modulation algorithms etc. Thereby, the LED's may be divided in groups, wherein each group of LED's e.g. has its own color of light, each group of LED's being driven by a suitable modulation technique with a certain duty cycle. An example thereof is provided in WO2006107199 A2, wherein LED's or groups of LED's are connected in series, the LED's or groups of LED's each being provided with its own switching device connected in parallel to the group or to each LED. A current source is provided to generate a current through the series connection of LED's or groups of LED's. Closing the parallel switch will bypass the LED or group of LED's so as to switch it off.

At a lower intensity, a change in the intensity by an increase or decrease of the duty cycle becomes relatively larger, the smaller the duty cycle. As an example, assuming a 16 bit duty cycle information, a decrement from FFFF (hexadecimal) to FFFE (hexadecimal) provides percentagewise a small reduction, thus enabling a smooth dimming, while a decrement of for example 0009 to 0008 provides percentagewise a large reduction. This effect may be emphasized by a sensitivity of the human eye, which is commonly assumed to have a logarithmic or similar characteristic. Hence, at low intensity levels and low duty cycles, an increment or decrement in duty cycle will result in a relatively more noticeable change than at large duty cycles. Hence, at low intensities, a possibly less smooth change in intensity can be obtained as compared to more large intensities.

Accordingly, an object of a second aspect of the invention is to provide a higher dimming resolution at lower intensities.

SUMMARY OF THE INVENTION

According to a first aspect of the invention, there is provided a control unit for an LED assembly comprising a first and second LED unit, said LED units being serial connected, the LED assembly, in use, being powered by a switched mode power supply, the control unit being arranged to receive an input signal representing a desired output characteristic of the LED assembly, determine a first and second duty cycle for the respective first and second LED units associated with a nominal current of the switched mode power supply, for providing the desired output characteristic, determine the largest of the first and second duty cycles for respective LED units, determine a reduced current based on at least the largest of the duty cycles, adjust the first and second duty cycle for respective LED units based on the reduced current or the largest of the duty cycles, provide output data for the LED assembly and the switched mode power supply based on the adjusted first and second duty cycles and the reduced current.

Within the present invention, an LED unit is understood as comprising one or more light emitting diodes. In case the LED unit comprises more than one light emitting diode, said diodes can either be connected in series or in parallel, or a combination thereof.

AN LED assembly is understood as comprising more than one LED unit.

The control unit according to the present invention is arranged to receive an input signal representing a desired characteristic of the LED assembly. Such input signal can e.g. be an analogue signal or a digital signal. Such signal can e.g. be generated by a user interface such as a dimmer or push button. The desired characteristic of the LED assembly can e.g. be defined in any suitable way, e.g. optical or electrical, examples being a desired brightness/intensity or color.

The control unit according to the present invention can be applied to an LED assembly comprising multiple LED units, in particular an LED assembly comprising LED units connected in series. Said serial connection of LED units can e.g. be powered by a switched mode power supply such as a buck converter or a boost converter or any other switching power supply. In use, said power supply can provide a current to the serial connected LED units.

Each of the LED units is individually driven by the control unit, so as to operate the one or more LED's of each unit simultaneously. The control unit according to the present invention is further arranged to determine the required duty cycles of the LED units for obtaining the desired characteristic of the LED assembly, given the nominal current of the power supply. These duty cycles of the LED units can be represented as the percentage or the fraction of time that a current is provided to the LED unit (e.g. 50% or 0.5).

In order to operate at e.g. a reduced brightness, known control units merely reduce the duty cycle of the different LED units of the LED assembly. Thereby, a current level of the switched mode power supply is kept at its nominal level. This may result in a situation were the switched mode power supply, at certain levels of brightness, operates at a relatively low power efficiency. According to the invention, a current (or other relevant output characteristic) of the switched mode power supply is adjusted in such a way that an output current (or other relevant output characteristic) is provided which is adapted to meet the circumstances. As an example, reducing the output power of the LED units according to the state of the art may be achieved by reduction of the duty cycle with which the LED units are driven, while the current is kept at its nominal level. According to the invention however, a value is chosen for the current (or other relevant output characteristic) of the switched mode power supply and for the duty cycle, which results in the desired brightness (or other relevant output characteristic), however, at more power efficient working conditions of the e.g. switched mode power supply and/or other components involved. Due to the serial connection of the LED units, the same current may be applied in order to operate each of the LED units. Therefore, the operating current (or other relevant output characteristic) may be determined, taking into account a value of it as would be required by the different LED units. Thereto, the power supply may be set to such a level so as to provide an output current (or other relevant output characteristic), which has a sufficiently high value in order to be able to drive the LED unit which requires such value. For each of the LED units, a duty cycle is now selected or amended, in order to reflect the changed output current (or other relevant output characteristic) of the switched mode power supply. This may be illustrated by a simple example: Assume that three LED units are driven by the power supply, the LED units being serially connected. Assume that, at nominal operating current of the power supply, a duty cycle for the first, second and third units would be set at 10%, 1% and 1% resp. By reducing the output current of the power supply to e.g. $\frac{1}{10}^{th}$ of its nominal value, and increasing the duty cycles of the units by a factor 10, the same brightness level would be obtained, thereby operating the power supply at a low current which may achieve a more favourable power efficiency thereof. In general, reducing the current (or other relevant output characteristic) of the power supply by a factor N may be combined with an increase of the duty cycle of each of the units by that same factor. The factor N is determined from the largest one of the duty cycles of the LED units. Reducing the output current (or other relevant output characteristic) of the power supply may be performed stepwise or as a continuous value within a certain operating range. In general, the reduced current will be set so as to keep the duty cycle of the LED unit requiring the largest duty cycle to a value below or equal to 100%. Depending on an implementation, a maximum effect may be achieved by reducing the current such that it substantially corresponds to the nominal current multiplied with the largest duty cycle. Thereby, the LED unit requiring the largest duty cycle is then operated at substantially 100% duty cycle. It is noted that the term duty cycle may refer to a periodic part of any type of time period, e.g. continuous time, time slots, etc. 100% duty cycle may thus be interpreted so as to comprise 100% of continuous time or 100% of any (e.g. repetitive) time slot. It can be noted that the steps as performed by the control unit can be performed in any suitable time order. It is for example possible that the step of determining the reduced current based on the at least largest duty cycle may equally applied when the adjusted duty cycles are already determined, e.g. based on the largest duty cycle. When the LED assembly and power supply are thus operated based on the reduced current and adjusted duty cycles, rather than based on the nominal current and the duty cycles associated with this current, an improved efficiency can be observed either with the LED units of the LED assembly or with the power supply, as will be detailed further below.

The control unit as applied in the present invention can e.g. comprise a programmable device such as a microprocessor or microcontroller or another processing unit, the programmable device being programmed with suitable program instructions in order to provide the functionality as described in this document. Further solutions are imaginable too, such as analogue hardware or electronic circuits. The output data provided by the control unit for obtaining the desired characteristic can be in any suitable form e.g. as a data stream on a data bus, a data stream in any digital format, as separate signals for the duty cycle and the switched mode power supply, e.g. Pulse Width Modulation, as an analogue voltage level, or as any other information. The output data may comprise single signals or multiple signals. Where in this document signal or signals are applied, this is to be understood as to comprise any form of output data.

According to a second aspect of the invention, there is provided a control unit for an LED assembly comprising a first and second LED unit, said LED units being serial connected, the LED assembly, in use, being powered by a switched mode power supply, the control unit being arranged to receive an input signal representing a desired output characteristic of the LED assembly, determine a power supply current of the switched mode power supply from the received input signal, determine a first and second duty cycle for the respective first and second LED units from the determined power supply current and the input signal, the combination of duty cycle and power supply current being set for providing the desired output characteristic, provide output data for the LED assembly and the switched mode power supply based on the determined first and second duty cycles and the determined power supply current.

Thereby, in addition to the duty cycle dimming as known from the art, a further mechanism for dimming may be made available. Hence, at low intensities, where the resolution of the duty cycle dimming may set a limit to the obtainable brightness resolution, the power supply current may be reduced allowing a larger duty cycle hence allowing a higher brightness resolution. Furthermore, power efficiency may be increased as described above.

A lighting system comprising an LED assembly that comprises a first and second LED unit and the control unit for controlling the LED assembly may further comprise a feedback circuit to feed a signal representative of the power supply current to a feedback input of the switched mode power supply, the feedback circuit comprising a digital potentiometer, the control unit having a control output connected to the digital potentiometer for controlling the power supply current. By using a (microprocessor controllable) digital potentiometer, e.g. in a feedback circuit of an amplifier, in a resistive level shifter, in a resistive attenuator or otherwise, an accurate, fast, low cost control of the current may be obtained, while enabling a convenient interfacing with the control unit.

The power supply current may further be controlled by controlling the power supply current to a first value in a first part of a cycle time and to a second value in a second part of the cycle time, to thereby obtain an effective power supply current between these values, thereby allowing e.g. a further increase in brightness resolution.

According to yet an other aspect of the invention, a control unit is provided that can be applied to control an LED assembly comprising multiple LED units wherein each LED unit is powered by a separate power supply. The power supplies of the multiple LED units can e.g. be arranged in parallel and powered by a common DC bus voltage. As such, according to the invention, there is provided a control unit for an LED assembly comprising a plurality of LED units, each LED unit being powered by a separate power supply, the control unit being arranged to:
receiving an input signal, the input signal representing a desired output characteristic of the LED assembly,
determine, based on an efficiency characteristic of the power supplies and on the input signal, a duty cycle for each of the LED units to obtain the desired output characteristic, thereby maximising the number of LED units operating at a maximum efficiency of the efficiency characteristic.

The control unit enables an LED assembly comprising a plurality of LED units each having a separate power supply to operate at an improved efficiency.

In an embodiment, the control unit is further arranged to provide output data for the LED assembly and power supplies based on the duty cycles for controlling the LED assembly and power supplies.

DESCRIPTION

Figure 1:
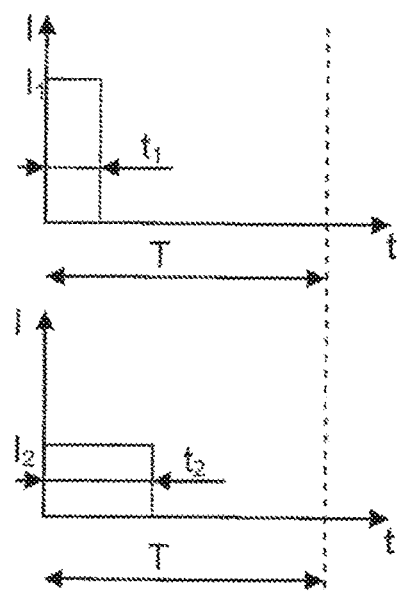
FIG. 1 depicts the situation for a state of the art system in which a low brightness is generated.

In order to obtain a desired characteristic of a lighting system comprising an LED unit, several variables are available for obtaining this characteristic. As an example, when powered by a switched mode power supply such as a buck converter, the required characteristic can be obtained by providing a current I to the LED unit having a certain duty cycle. In case the duty cycle required to provide the desired characteristic, the desired characteristic may also be obtained by selecting a smaller current, combined with an increased duty cycle. This is illustrated in FIG. 1. Assuming that, in order to provide a desired characteristic (e.g. a desired brightness), a current $I_1$ is provided with a duty cycle $t_1/T$ (e.g. 25%), see top part of FIG. 1. In case of a linear relationship between the desired characteristic and the current, the desired characteristic may also be achieved by providing a current $I_2=I_1/2$ with a duty cycle $t_2=2*t_1$. In the relationship between the current provided to the LED unit and the characteristic is not linear, a correction may need to be applied to either the current or the duty cycle in order to realise the same desired characteristic, see further on.

Providing a current I with a certain duty cycle to an LED unit can be realised in different ways. As an example, when an LED unit is e.g. supplied from a buck converter, a certain duty cycle can be realised by switching the converter resulting in a certain ON time and OFF time. The duty cycle can then be defined as the percentage ON time.

Alternatively, a current I with a certain duty cycle can be realised by providing a substantially constant current I by the power supply, e.g. a buck converter, and controlling a switch provided in parallel to the LED unit. When such switch is closed, the current provided by the converter is redirected from the LED unit to the closed switch. A lighting system according to the present invention that enables both methods of providing a current I to an LED unit is schematically depicted in FIG. 2.

Figure 2:
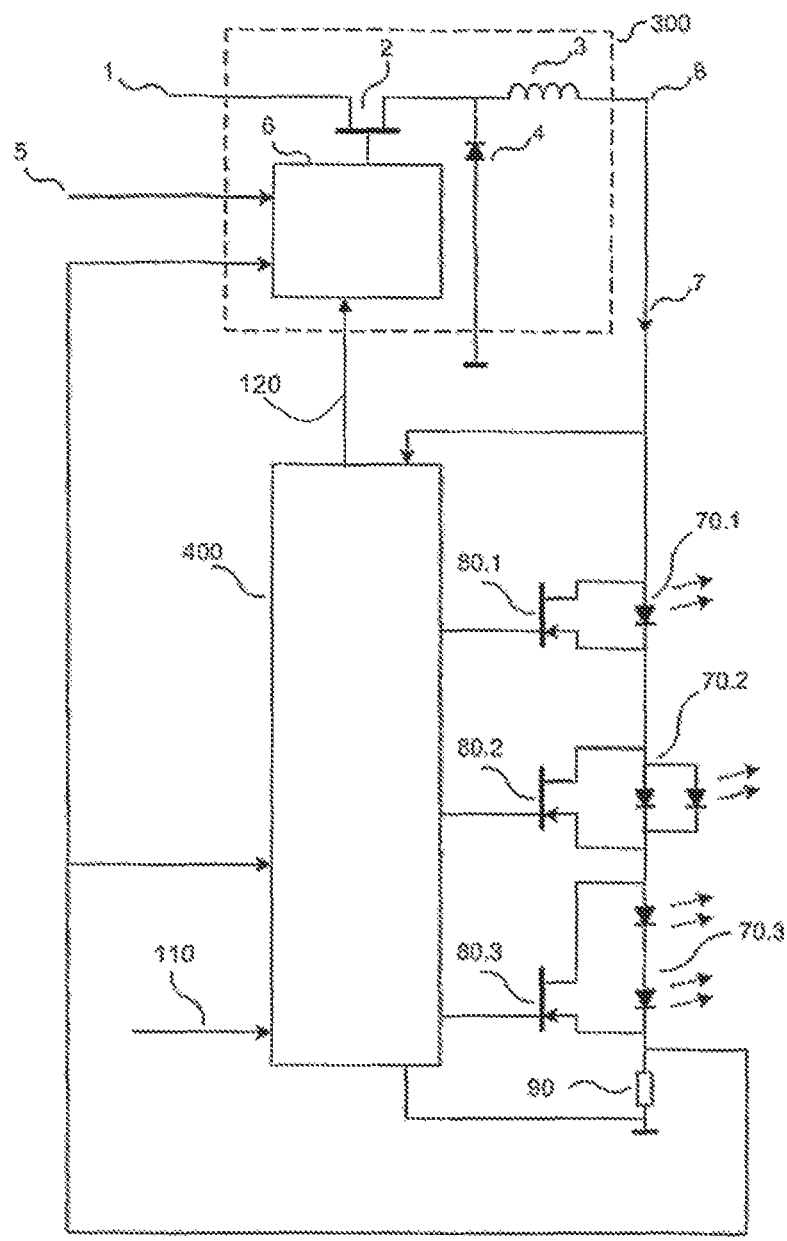
FIG. 2 depicts an embodiment of a lighting system according to the present invention.

FIG. 2 schematically depicts a lighting system comprising a control unit 400 arranged to control a switched mode power supply 300 and an LED assembly comprising three LED units 70.1, 70.2 and 70.3. The LED assembly further comprises switches (e.g. MOSFET's) 80.1, 80.2 and 80.3 associated with each LED unit for controlling the current per LED unit.

In order to provide a desired output characteristic of the LED assembly, each of the LED units can be driven at a certain duty cycle. The control unit 400 is arranged to receive an input signal 110 that may represent a desired characteristic (e.g. a certain brightness or color) of the LED assembly. The power supply 300 is known as a buck converter and comprises a switching element 2, an inductance 3 and a diode 4. A controller 6 controls the switching of the switching element 2, e.g. based on a reference input 5 and a feedback of the LED assembly. A voltage over the resistance 90 of the LED assembly can e.g. be applied as a feedback for the actual current 7 provided by the power supply. The control unit 400 can further be arranged to provide an output signal 120 to the power supply 300 for controlling the output of the power supply. Designated by reference number 1 is the supply voltage of the power supply (e.g. 16 or 24 V), designated by reference number 8 is the output voltage of the power supply which substantially corresponds to the sum of the voltages over the multiple LED units, also referred to as the forward voltage over the LED units.

In accordance with the present invention, the control unit 400 is arranged to provide a control signal to the LED assembly. As such, the switches 80 can be controlled and the different LED units can be arranged to operate at a certain duty cycle.

Figure 3:
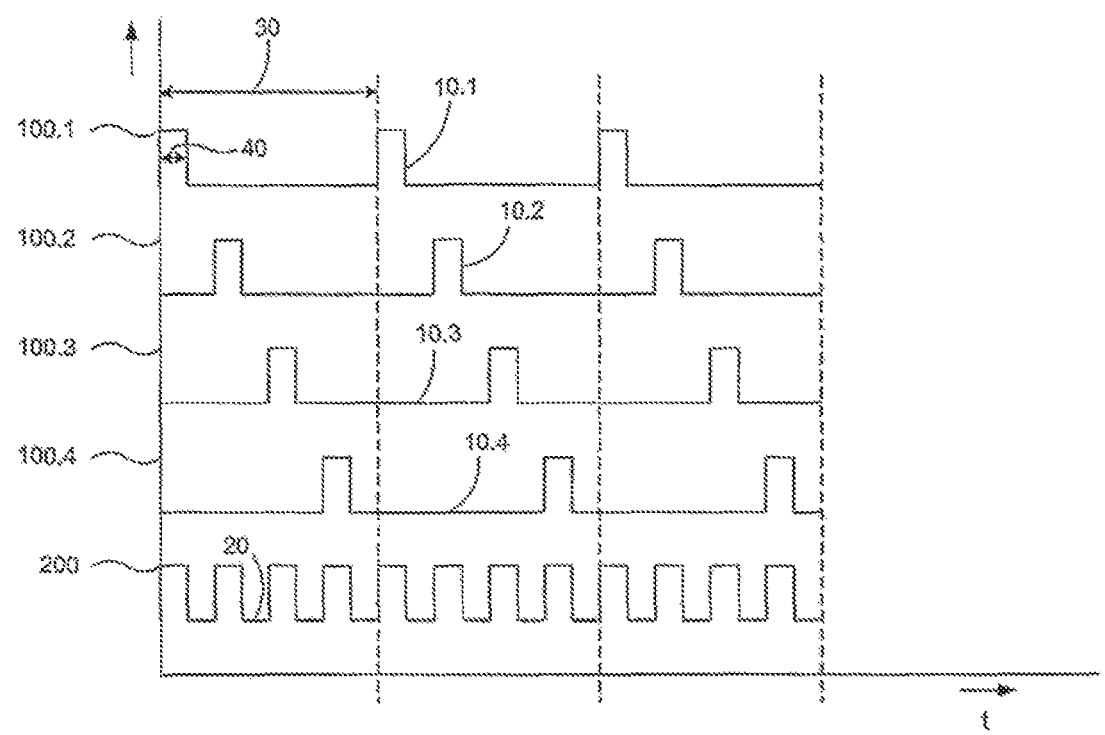
FIG. 3 schematically depicts the duty cycles of a plurality of LED units for a desired characteristic when a nominal current is applied.
Figure 4:
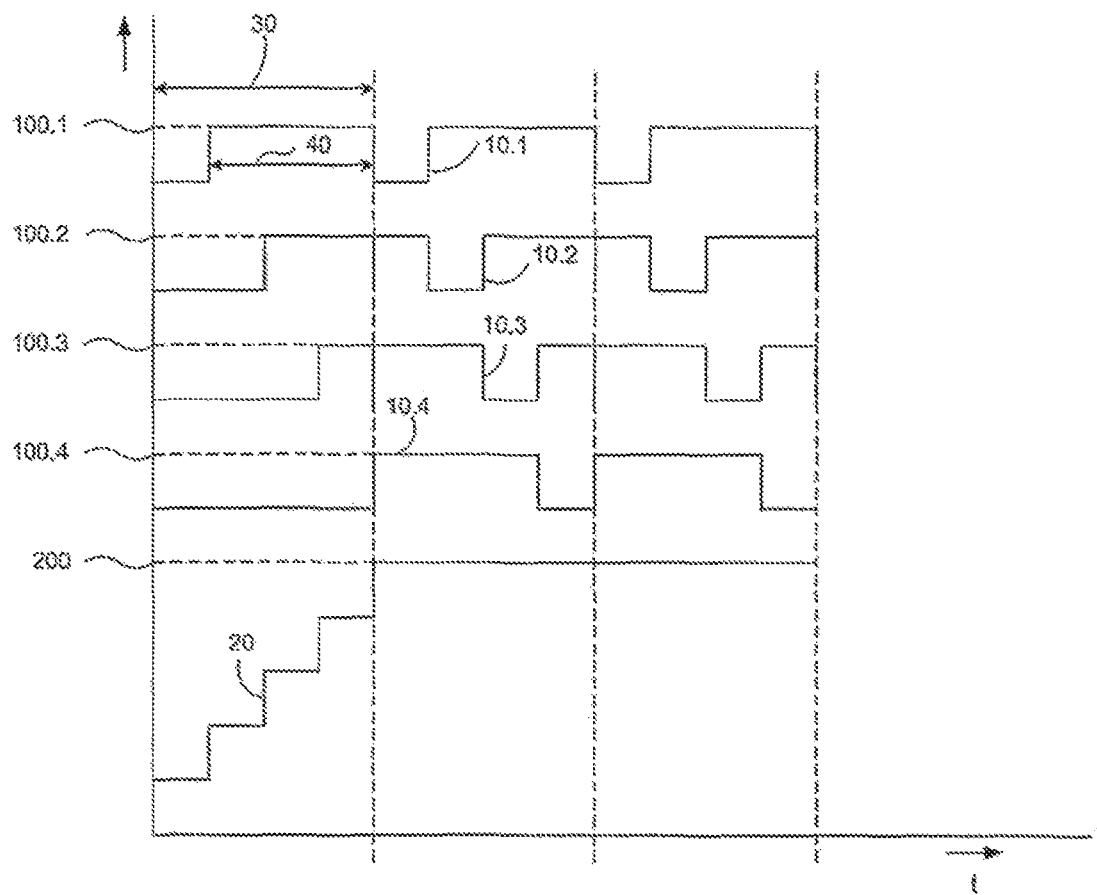
FIG. 4 schematically depicts the adjusted duty cycles of a plurality of LED units for a desired characteristic when a reduced current is applied.

In order to illustrate this, FIG. 3 schematically depicts the ON and OFF times for a set of 4 LED units 100.1, 100.2, 100.3 and 100.4 through the curves 10.1, 10.2, 10.3 and 10.4 as a function of time t. For example, curve 10.1 could represent the ON time 40 and the OFF time 30-40 for an LED unit 100.1, while the curves 10.2, 10.3 and 10.4 represent the ON and OFF times for units 100.2, 100.3 and 100.4. Note that the duty cycle corresponding to curve 10.1 can be expressed as ON time 40 over time 30. During the ON time, a current can be provided to the LED unit; during the OFF time, the current can e.g. be redirected to a switch that is in parallel with the LED unit. See, as an example, switch 80.2 in FIG. 2 that is arranged to short-circuit the LED unit 70.2. During the ON time, said switch 80.2 can be open, during the OFF time, the switch 80.2 can be closed. FIG. 3 further schematically depicts a curve 20 representing the forward voltage 200 over the serial connection of the 4 LED units. Referring to FIG. 2, this forward voltage would substantially correspond to the voltage observed at the output 8 of the power supply 300 (neglecting the voltage over the resistance 90). In the situation as shown, only a single LED unit is switched on at the same time. As such, the forward voltage over the serial connection of the 4 LED units will be moderate, e.g. 3-4 V. Assuming that the duty cycles for the LED units as shown in FIG. 3 correspond to the application of the nominal current of the power supply, FIG. 4 schematically depicts the required duty cycles for the LED units at a reduced current. In order to obtain the same output characteristic of the LED assembly, the duty cycles of the LED units may need to increase, e.g. compare the ratio 40/30 in FIGS. 3 and 4. As a result, as can be seen from curve 20 representing the forward voltage 200 over the serial connection of the LED units, the forward voltage 200 over the LED units can be substantially larger.

In accordance with the present invention, it has been observed that it may be advantageous to operate a lighting system by applying a reduced current (compared to the nominal current of the power supply) in combination with increased duty cycles for driving the LED units of the LED assembly of the lighting system. Applying a reduced current, will in general, as illustrated in FIGS. 3 and 4 require adjusted duty cycles of the LED units that will be larger than the duty cycles required at nominal current. Operating an LED assembly at a reduced current and corresponding increased duty cycles for the LED units of the assembly may have one or more of the following advantages (reference numbers refer to elements as shown in FIG. 2):

The dissipation occurring in switcher element 2 of the power supply 300 may be reduced when a reduced current is applied. In order to provide the required (reduced) current to the LED assembly, the switcher element 2 of the power supply will operate at a certain duty cycle (further on referred to as $DC_{sw}$). In case the forward voltage over the serial connection of LED units is increased due to the application of the reduced current, this duty cycle $DC_{sw}$ may be larger compared to the application of the nominal current. The dissipation in the switcher element is proportional to this $DC_{sw}$, but is also proportional to the square of the current provided. Overall, this may result in a decrease in dissipation.

In case the switcher element 2 is open, the output current 7 of the power supply flows through the diode 4, resulting in a dissipation in the diode. In general, this dissipation is proportional to the current through the diode and proportional to the fraction of time the current runs through the diode, i.e. $(1-DC_{sw})$. Therefore, in case the application of a reduced current results in an increase of $DC_{sw}$, the dissipation in the diode 4 may be reduced because of the reduction of $(1-DC_{sw})$ and because of the reduction of the current through the diode.

Similar observations can be made with respect to the LED assembly; the dissipation in the LED units may be reduced because of the reduced current (the dissipation being proportional to the square of the current), despite an increase in duty cycle. Equally, the dissipation in e.g. the switches 80 as shown in FIG. 2 may decrease; the switches will be closed over a shorter fraction of time as the duty cycle of the LED units increases, additionally, the current through the switches will be the reduced current, i.e. smaller than the nominal current.

In an embodiment of the present invention, the reduced current substantially corresponds to the nominal current multiplied with the largest duty cycle. By doing so, an adjusted duty cycle of approx. 100% will be obtained for the LED unit having the largest duty cycle. As the duty cycle of the LED units cannot be more than 100%, the reduced current as obtained in this way corresponds to the smallest current that enables the provision of the desired characteristic of the LED assembly.

Figure 5A:
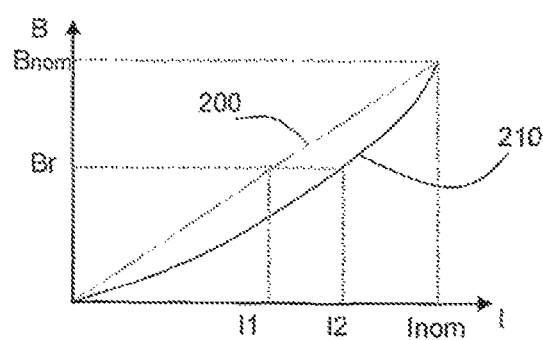
FIG. 5a schematically depicts a graph describing the brightness vs. current of an LED unit.

Note that the current reduction as described in the previous paragraph assumes a linear correspondence between the output of the LED unit and the current. In case this is not true, a correction can be applied to the reduced current to ensure that the desired characteristic of the LED assembly is met. This is illustrated in FIG. 5a. FIG. 5a schematically depicts a brightness (B) characteristic for an LED unit. The brightness (B) characteristic shows the brightness (B) as a function of the current through the LED unit. Indicated on the graph is the brightness Bnom corresponding to the nominal current Inom. In case of a linear correspondence between the brightness and the current (graph 200), a reduced brightness Br would be obtained when a current I1 is applied in stead of Inom. In case the actual characteristic of brightness vs. current is in accordance to graph 210, a current I1 will produce a brightness smaller than Br. In order to obtain a brightness Br, a current I2 is required. In case the largest duty cycle of the LED units (as calculated based on the nominal current) would correspond to Br/Bnom, a current reduction of Inom to I1 would results in a reduced brightness that cannot be compensated entirely by increasing the duty cycle, as this would require a duty cycle above 100%. Rather, based on the brightness vs. current characteristic of the LED unit (which e.g. can be determined by experiments) the current can be reduced to I2. Apply a current I2 combined with an increase of the duty cycle (increasing the duty cycle Br; Bnom by a factor of Bnom/Br) results in the same brightness characteristic.

The control unit according to the present invention can advantageously be applied for controlling an LED assembly comprising two or more LED units that are connected in series. As explained above, the determination of the duty cycles for the multiple LED units using a control unit according to the present invention may result in an improvement of the efficiency of the power supply powering the LED units. In general, adjusting the duty cycles of the LED units as described above may result in the application of larger duty cycles in order to compensate for the application of a reduced current. It has been observed that the application of a larger duty cycle for an LED unit may have a further advantage in that it may reduce flicker. Flicker of an LED assembly may occur as either visible flicker or non-visible flicker, the latter may e.g. cause nausea. When an LED unit is e.g. operated at a duty cycle of 90%, a smaller occurring flicker can be observed compared to a duty cycle of e.g. 10%.

According to an other aspect, the present invention provides in an improved way of powering an LED assembly comprising a plurality of LED units, arranged in parallel, each LED unit being powered by a different/separate power supply, e.g. a switched mode current supply such as a buck or boost converter. This improved way of powering, in general, operating an LED assembly, can be implemented in a control unit for controlling an LED assembly comprising a plurality of LED units (each comprising one or more LEDs) and wherein each LED unit is powered by a separate power supply such as a switched mode current supply. To illustrate the improved way of powering, assume the LED assembly to comprise two LED's connected in parallel, each provided with a switched mode current supply for providing a current to the LED. The light emitted by the LED's having substantially the same color.

In such case, in order to realise a desired brightness from the LED's taken together, the conventional way is to adjust the duty cycles of the different LED's in the same manner.

As such, a desired brightness of 50% of the nominal (or maximal) brightness, can be realised by controlling both LED's substantially at a duty cycle of 50%. Note that a correction as discussed in FIG. 5a may equally be applied.

As described above, operating or powering an LED unit at a power level less than 100% can be realised by operating the LED unit at a reduced duty cycle by e.g. operating a switch in parallel to the LED unit. By short circuiting the switch, the LED or LED unit is turned off. As an alternative, powering an LED unit at a power level less than 100% can also be realised by reducing the current to the LED unit. In case of an LED assembly comprising a plurality of LED units, each being powered by a separate power supply, each LED unit can thus be powered with a different current and/or operated at a different duty cycle.

It has been observed that the efficiency of a switched mode power source may vary, depending on the load to be powered (i.e. the LED's or LED units) or the operating conditions (e.g. the current to be supplied, the duty cycle of the load). As explained above, losses in the switcher element or diode of the power supply may vary with these conditions. Rather than controlling the different LED's in substantially the same way (i.e. have them operate at the same duty cycle), the present invention proposes to take the actual efficiency characteristic of the power supplies into account. In the example as discussed, a brightness of 50% may equally be realised by operating one of the LED's at 100% duty cycle and the other LED at 0% duty cycle. As the efficiency of the power supply when powering an LED at a 50% duty cycle may be lower than the efficiency at a 100% duty cycle, the application of different duty cycles may prove advantageous. Assuming the efficiency characteristic of the power supplies is known, a control unit can be arranged to determine which combination of duty cycles provide for the best efficiency for a given desired characteristic of the LED assembly. An efficiency characteristic of a power supply can e.g. be determined experimentally or based on theoretical considerations.

Figure 5B:
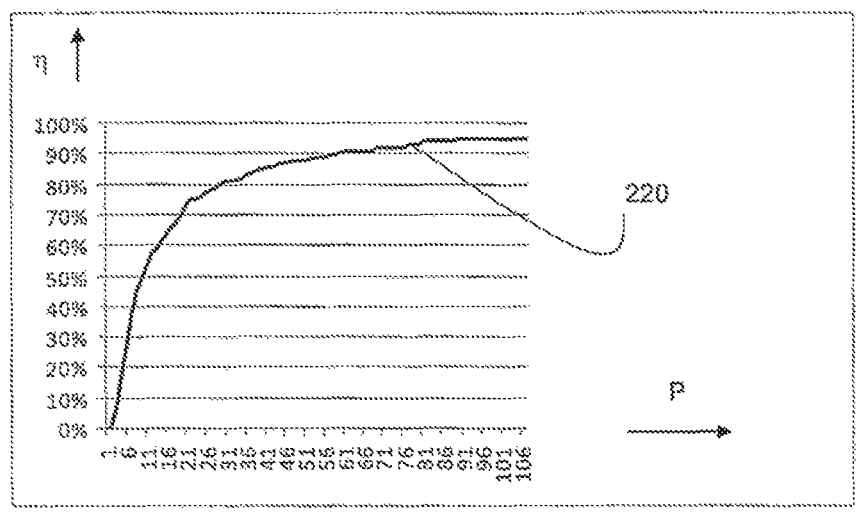
FIG. 5b schematically depicts an efficiency characteristic of a power supply for an LED unit.

The following figures further illustrate the above described way of powering a plurality of LEDs or LED units, each being powered by a separate power supply such as a switched mode current supply. Assuming an LED assembly comprising 4 LED units, each LED unit being powered by a power supply having an efficiency characteristic as schematically depicted in FIG. 5b. Note that, in general, the four power supplies, e.g. switched mode current supplies such as Buck or Boost converters, can be powered from a common input power such as a DC bus thereby resulting in the power supplies of the LED units operating in parallel. The method of powering according to the invention however does not require the plurality of power supplies to be connected in parallel, they may also be powered independently. As can be seen from FIG. 5b, the efficiency ($\eta$) characteristic of the power supply has a non-linear shape having a comparatively small slope at a high power output P (in % of a nominal power) since a decrease in power from 100% to 75% only results in an efficiency reduction from approx. 95% to approx. 90%, and a comparatively large slope at a low power output P.

In case the four LED units would be operated at substantially the same duty-cycle at dimming levels ranging from 0% to 100%, the skilled person can understand that the overall power efficiency of the four power supplies together, has a characteristic having the same shape as the characteristic shown in FIG. 5b. An improved overall efficiency of the power supplies taken together can be obtained by applying the following method. Instead of operating the different LED units at substantially the same duty-cycle, the proposed method ensures that the overall efficiency is optimised by taking the efficiency characteristic of the power supply into account when determining the duty cycle of the LED units to obtain a desired output characteristic. In case the power supplies of the four LED units have an efficiency characteristic as shown in FIG. 5b, it can be deduced that the overall efficiency is optimised by maintaining as many of the LED units as possible at the maximum power output (i.e. have the LED units operate at a 100% duty cycle) rather than reducing the duty cycle of the LED units simultaneously. This is due to the fact, as can be seen from the efficiency characteristic, that the efficiency of the power supply has is maximised at a 100% power output. For the given example, a dimming level of 80% for the LED assembly would thus be realised by operating three LED units at a 100% duty cycle or 100% current (realising a LED assembly light output of 75%) and one LED unit at a 20% duty cycle or 20% of the nominal current (contributing an additional 5% light output of the LED assembly).

Figure 5C:
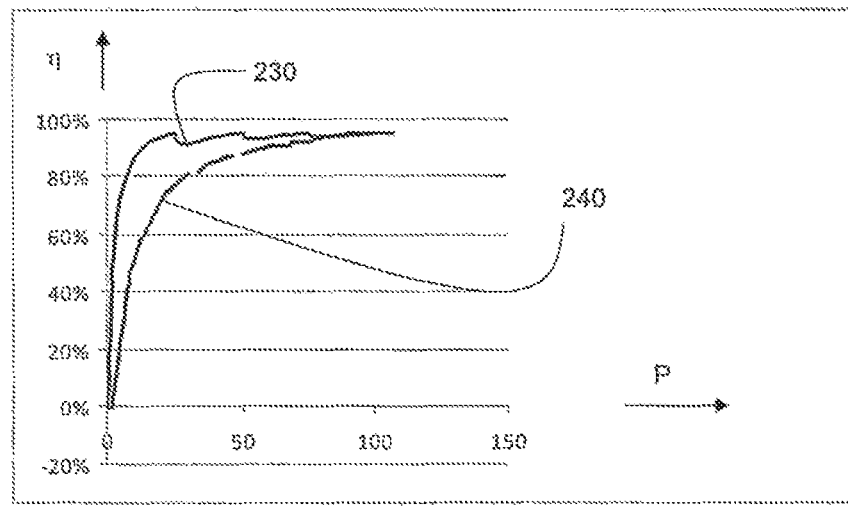
FIG. 5c schematically depicts two efficiency characteristics for an LED assembly applying two different methods of operating a plurality of LED units of the LED assembly.

A dimming level of 75% for the LED assembly would thus be realised by operating three LED units at a 100% duty cycle and turning the fourth LED unit off. When a further reduction of the dimming level of the LED assembly is required (50%<dimming level<75%), two LED units remain operating at a 100% duty cycle, one LED unit is turned off and the remaining LED unit is operated at the appropriate duty cycle or current to obtain the required dimming level for the LED assembly. As a result, an improved overall efficiency for the power supply to the LED assembly is realised. FIG. 5c schematically depicts a first graph 230 showing the overall efficiency ($\eta$) of the power supplies powering the LED assembly when the method according to the invention is applied (each power supply is assumed to have an efficiency characteristic as shown in FIG. 5b). In case the duty cycles or current of the LED units are reduced simultaneously with the same amount in order to reduce the LED assembly light output, efficiency characteristic 240 is obtained. As can be seen, an improved efficiency of the LED assembly powering can be obtained by applying the powering method as described above. In particular when operating a comparatively low light output levels (e.g. ranging from 10% to 25% of the nominal output) an important efficiency gain (>25%) can be realised in case of a power supply efficiency characteristic as shown in FIG. 5b. When implemented in a control unit for an LED assembly, the control unit can thus be arranged to:

receive an input signal, the input signal representing a desired output characteristic of the LED assembly, and determine, based on an efficiency characteristic of the power supplies powering the LED units of the LED assembly and on the input signal, a duty cycle for each of the LED units to obtain the desired output characteristic, thereby maximising the number of LED units operating at a maximum efficiency of the efficiency characteristic. By maximising the number of LED units operating at maximum efficiency, an improved overall efficiency is obtained.

As described above, instead of operating the LED units at different duty cycles, they can also be operated at different current levels. Referring to the efficiency characteristic of FIG. 5b, operating at maximum efficiency would correspond to operating the power supply at nominal current (corresponding to a power output P of 100%). Operating the power supply at a lower current would thus result in a decreased efficiency.

As such, the control unit may thus also be arranged to:

receive an input signal, the input signal representing a desired output characteristic of the LED assembly, and determine, based on an efficiency characteristic of the power supplies powering the LED units of the LED assembly and on the input signal, a current level for each of the LED units to obtain the desired output characteristic, thereby maximising the number of LED units operating at a maximum efficiency of the efficiency characteristic.

In case a large difference exist between the duty cycles or currents applied to the different LED groups, it may be advantageous to apply the different duty cycles or currents in an alternating manner to the different LED groups at such a frequency that each of the LED units appears to operate at the same light output. In case each LED unit comprises the same number of substantially identical LEDs, alternatingly applying the different duty cycles or currents to each of the LED units can be readily applied. In case the LED units comprise LEDs having different output characteristics, said output characteristics can be taken into account.

In case the above described way of optimising the power efficiency is applied in a lighting application, it may be advantageous to arrange or distribute the LED or LEDs of the plurality of LED units in such manner that, regardless of the application of different duty cycles or currents for different LED units, a comparatively homogenous light distribution is obtained. In order to obtain such homogenous distribution, the lighting application may also be equipped with an optical element such as a diffuser.

Figure 6:
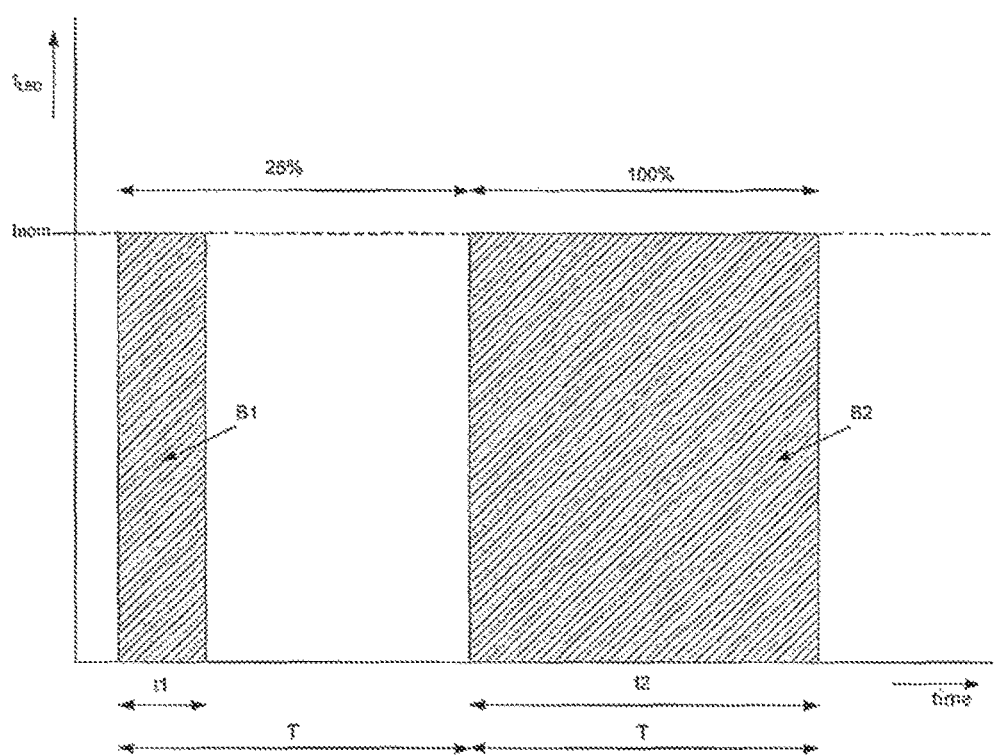
FIGS. 6 and 7 depict time diagrams of duty cycling according to the state of the art.

FIG. 6 depicts a time diagram to illustrate a duty cycling of LEDs according to the state of the art. Time is depicted along the horizontal axis while the LED current as provided by the power supply (e.g. the current provided by the power supply 300 in FIG. 2) is depicted along the vertical axis. In traditional duty cycling of an LED for brightness control, a constant, nominal current Inom is sent through the LED during ON time and is obstructed to flow through the LED at OFF time—in the configuration according to FIG. 2 e.g. by a closing of the parallel switch, as explained above. An average brightness is proportional to surface B1 and B2 respectively as indicated in FIG. 6. At the given nominal current Inom, the average brightness is proportional to the factor t/T. In the graph two examples are given, a first one depicted in the left half of FIG. 6, where t1/T=0.25 and a second one in the right half of FIG. 6, where t2/T=1. In the examples depicted here, the on time of the LED or LEDs is formed by a single pulse. Alternatively, the on time period may be formed by a plurality of shorter time periods, together providing the desired duty cycle.

Figure 7:
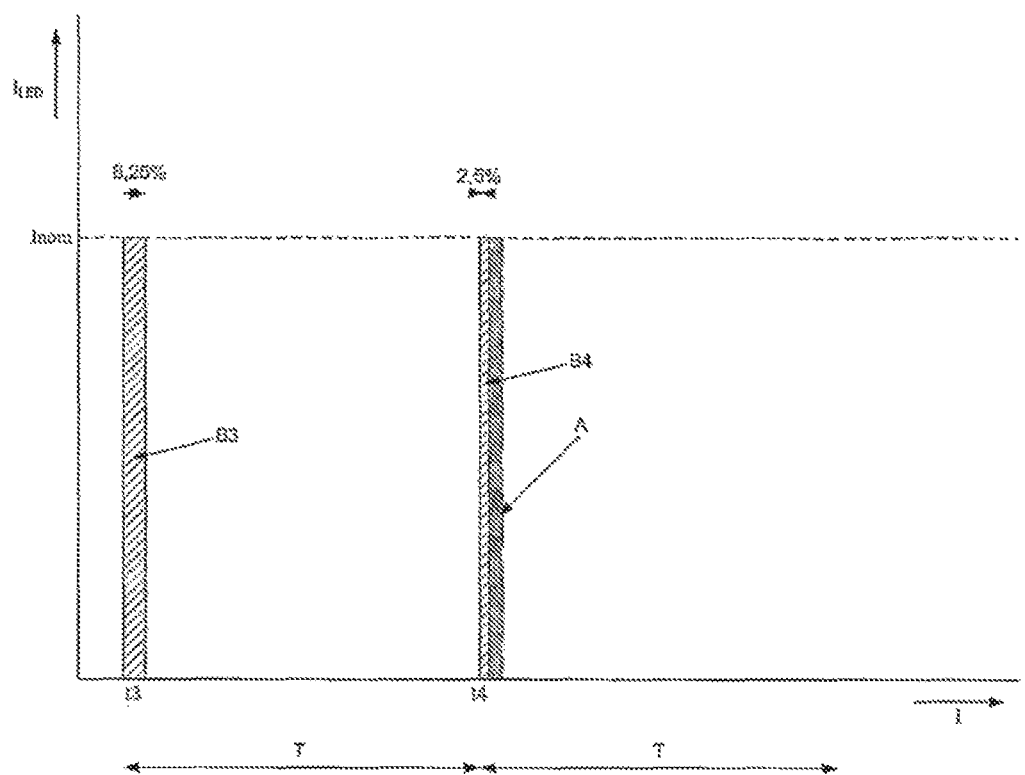

FIG. 7 depicts a time diagram of the LED current versus time, however at a lower duty cycle then in the examples provided by FIG. 6, to thereby illustrate a resolution limit in duty cycling according to the state of the art. Commonly, a duty cycle is modulated in a number of steps, e.g. expressed as a 16 bit number. A minimum duty cycle step is hence provided by the number of bits and the duty cycle time. At low duty cycles, changing the duty-cycle with the minimal duty cycle step, f.e. from t3 to t4, has a relatively high impact on the average brightness. In FIG. 7, bringing back the duty cycle from t3 to t4, reduces the brightness by a factor A/B3, hence providing, percentagewise, a substantial reduction which may be noticeable to the user as a sudden decrease in brightness.

In the concept of duty cycle dimming, a brightness resolution is therefore limited by the duty cycle resolution.

Figure 8:
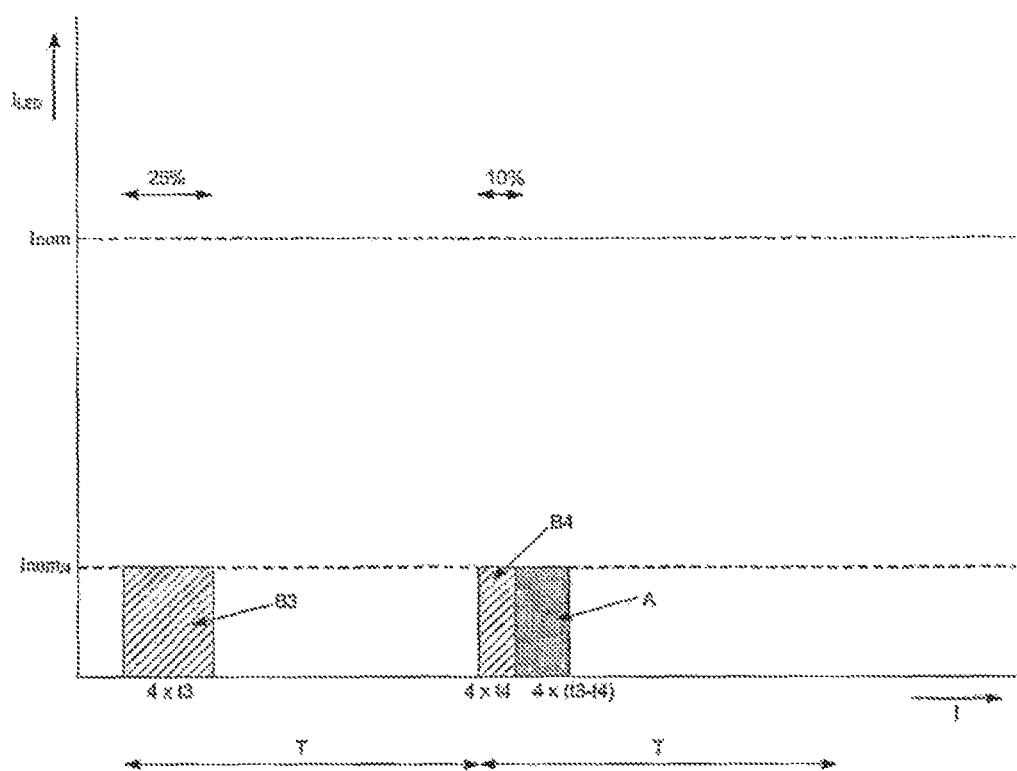
FIGS. 8, 9 and 10 depict time diagrams to illustrate further aspects of the invention.

FIG. 8 depicts a time diagram of the LED current versus time to illustrate how extra room for higher resolutions is achieved by lowering the LED current. The same brightnesses (depicted by B3 and B4 in previous FIG. 7) can also be achieved by lowering Inom and increasing the t/T (duty cycle) by a factor which substantially corresponds to the decrease in duty cycle. The larger duty cycle at the lower Inom will increase a brightness resolution as the duty cycle can then be altered in smaller steps. Thereby, the brightness may be controlled at a higher resolution with the same duty cycle t3-t4 steps as described above, as the larger duty cycle makes it possible to decrease the duty cycle at a higher resolution.

The above may be illustrated by a simple example: if at nominal power supply current t3 would be 0003 (Hex) and t4 0002 (Hex), then this minimum step of 0001 (Hex) would reduce the duty cycle by 33%, hence providing a brightness step of 33%. In case the current would be reduced by a factor 4, and hence the duty cycle would be increased by the same factor 4, then starting at a new value for t3: 4×0003 (Hex) providing 000C (Hex), would allow to increase or decrease the duty cycle in steps of 0001 (Hex), hence providing a brightness step of approximately 8%, thereby allowing a more smooth dimming.

Generally speaking, the concept of dimming the LEDs by a combination of duty cycle dimming and reducing the power supply current may, depending on the configuration, implementation, dimensioning, and other factors, provide for one of more of the below effects:

Smooth dimming may render a comparably lower amount of noise and flickering:

Noise:

A lower amount of noise may be produced by this method when compared to using only time duty cycling. Noise may be caused by electronic components, such as capacitors and coils, vibrating internally under varying voltage across or current through them. The lower noise may be due to the lower current through the LEDs flowing a higher percentage of the time, which may cause different frequency components that make up the current. The amplitude of frequency components causing noise may be lower. Also, the current value may be lower at lower brightnesses, which may cause lower mechanical forces in components like coils.

EMI:
Because of the lower content of higher frequency components, EMI may be lower.

Flickering:
As explained elsewhere in this document, as part of the dimming is done using more or less current, the visible flickering effect may be less then when achieving the same with an abrupt switching off and switching on of the current.

Further, because of the extra degree of freedom, a better optimum may be found while trading off time pulse width against current change pulse width against current absolute value.

Unnoticeable color shifts:
Because of the smoother brightness setting per color, also the total color may be set more accurately and a color change may be made smoother.

Figure 9:
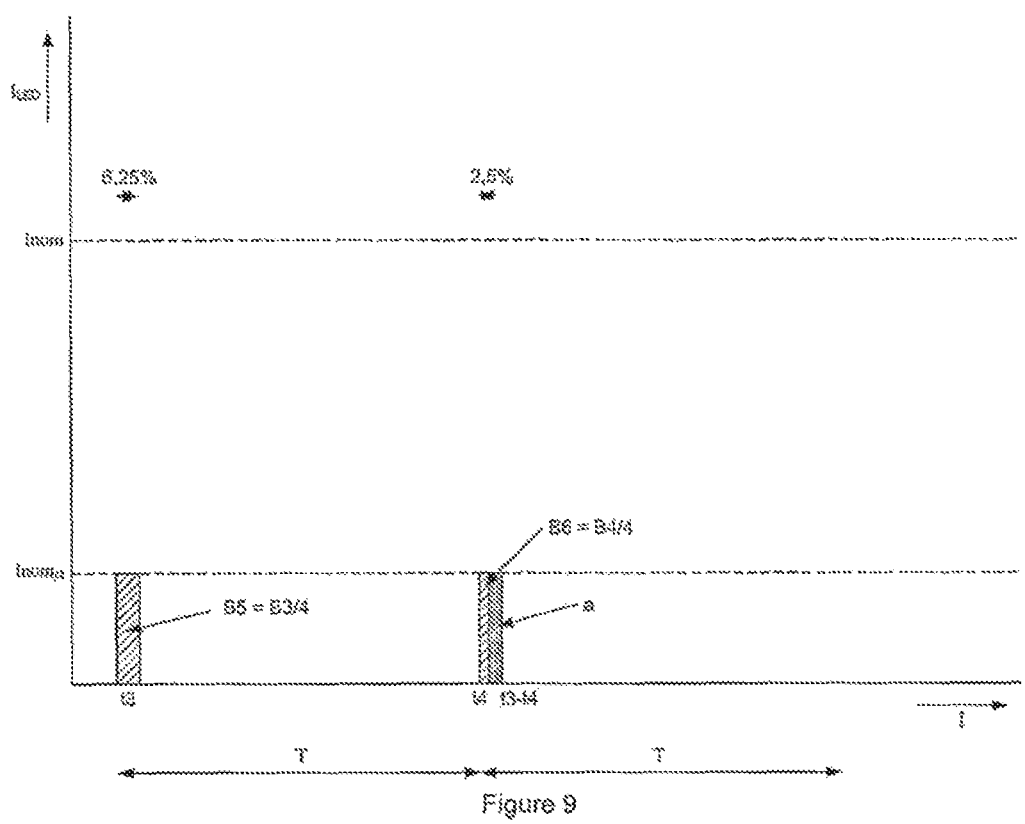

FIG. 9 depicts a time diagram of the LED current versus time to again illustrate how the higher resolution in brightness may be achieved by using a smallest duty cycle step in time. By making the smallest step in resolution at the lower Inom, the 'A' surface in the previous figure diminishes to the 'a' surface in the figure below, thereby controlling the brightness at a much higher resolution.

Figure 10:
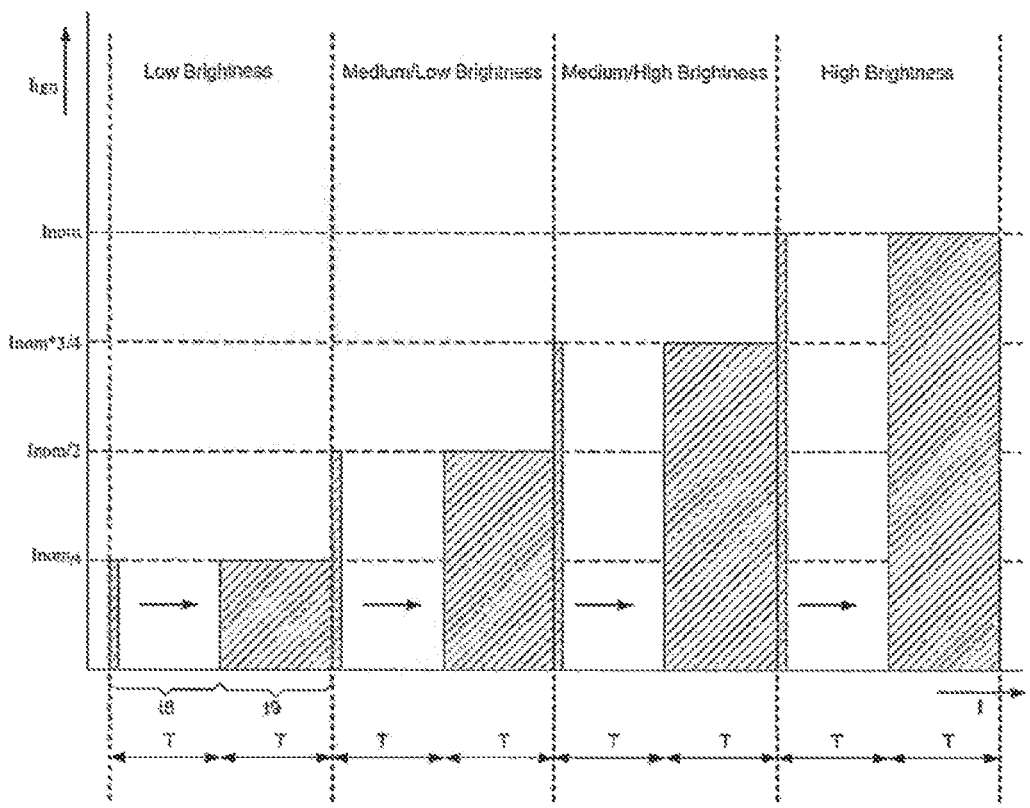

FIG. 10 depicts a time diagram of the LED current versus time to illustrate how the time duty cycle can be applied from 0% to 100% at various values for Inom, thus delivering various brightness steps per duty cycle step. Combined with the logarithmic sensitivity of the human eye, this provides small brightness steps at low brightness. As will be explained in more detail below, by switching Inom using e.g. a 6 to 8 bit potentiometer from a low value at low brightness setpoints to a high value at high brightness setpoints and controlling the brightness in between those points using duty cycling from 0 to 100%, the brightness can be controlled at a very high resolution of f.e. 20 bit by a combination of e.g. a 16 bit duty cycle and a 4 bit potentiometer. FIG. 10 depicts an example thereof for a 2 bit potentiometer, hence for 4 values of the nominal LED current. In a leftmost part of the figure, indicated by t8, t9, the power supply current has been reduced to Inom/4, allowing a brightness range from a smallest duty cycle (symbolically depicted by t8) to a largest duty cycle (depicted by t9). Increasing, in the next part of FIG. 10, the duty cycle to Inom/2 again allows a similar duty cycle range, which is again possible for Inom*3/4 and Inom, as depicted in the third and forth part of FIG. 10. Thereby, for each of the currents, a duty cycle range, and hence a brightness range is provided. In the chosen combination of a 16 bit duty cycle modulation and a 2 bit current modulation, the ranges will overlap, resulting in a total dimming range of 18 bit.

Figure 11:
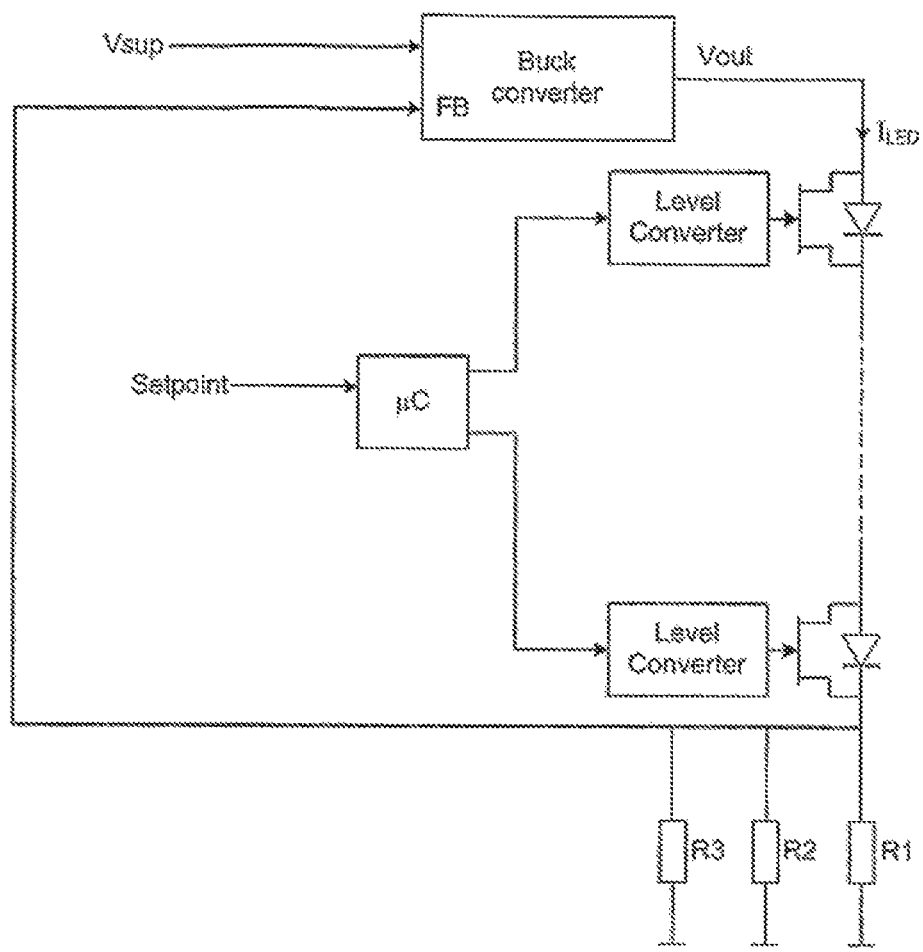
FIGS. 11-14 depicts a circuit diagrams to illustrate aspects of the invention.

FIG. 11 depicts a highly conceptual circuit diagram to illustrate a traditional current control. The current $I_{LED}$ delivered by the current source provided by in this example a buck converter topology from a supply voltage Vsup, is fed through the LEDs and through the parallel resistances R1, R2 and R3.

A voltage drop across the R1 through R3 resistance is fed back to the current source at a feedback input FB of the buck converter, thereby enabling control of an amplitude of the current. Duty cycle is controlled by the microcontroller μC, which, in response to a setpoint at a corresponding setpoint input, controls switches, such as in this example switching transistors, connected in parallel to each of the LEDs or LED groups. In order to take account of possible potential differences, the switches are controlled by the microcontroller via respective level converters.

As explained above, the current source in this example controls its output current by controlling the voltage present at input FB to a fixed value. By changing the total R1 through R3 resistance, f.e. by mounting different values for R2 and/or R3 or even leaving them out altogether, different current values can be set that will deliver the same voltage at pin FB. In this manner the nominal current Inom can be set to different values, e.g. for different applications.

Figure 12:
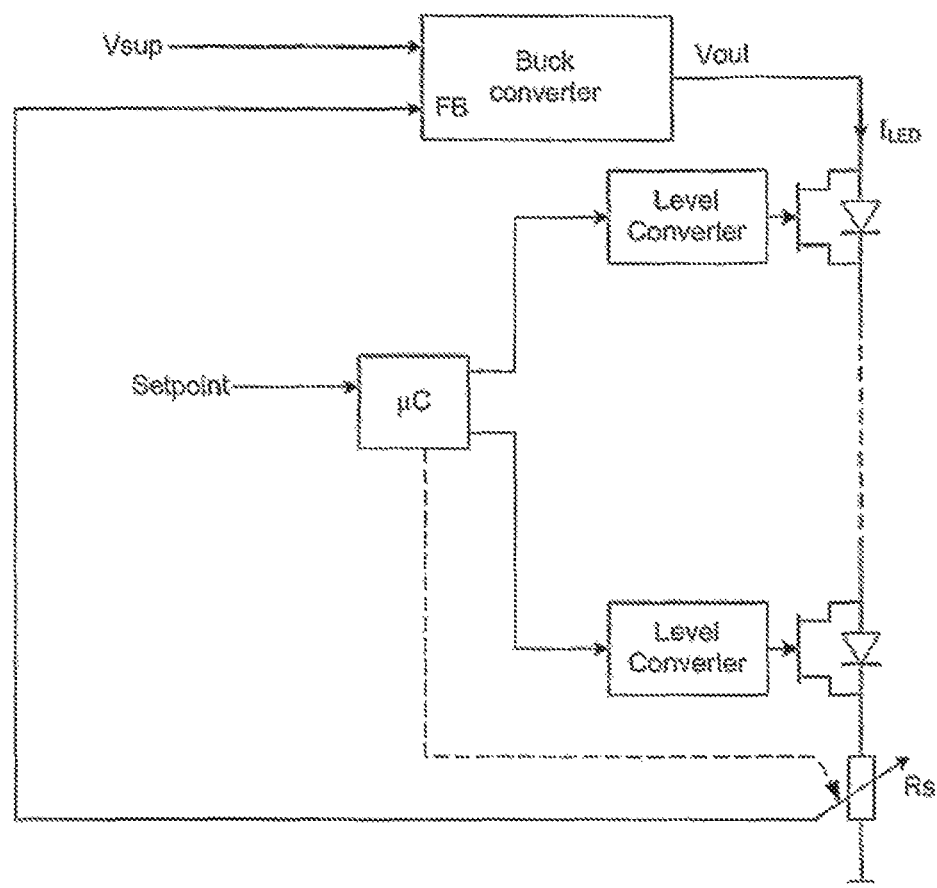

FIG. 12 depicts a highly schematic circuit diagram to illustrate a principle of replacing the above feedback resistance (typically only changeable through soldering) from the previous figure by a potentiometer. In this example, the potentiometer is connected such as to feed back a part of the voltage across the series resistor Rs to the pin FB. Thereby, the feedback voltage at the FB input is controlled, which provides for a controlling of the value of the LED current $I_{LED}$.

The digital potentiometer may be controllable by the microcontroller uC (as indicated by the dotted line) and thus by a suitable software programming and may form an integral part of the brightness and color control algorithm in the microcontroller uC. Especially the very flexible set of algorithms as described in WO2006107199 A2. Making use such algorithms, very smooth take-over profiles can be achieved when changing the (and consequently time duty cycle settings).

Note that the Rs resistance typically is very small and that potentiometers in general have larger values. A more practical arrangement will be described below.

Figure 13:
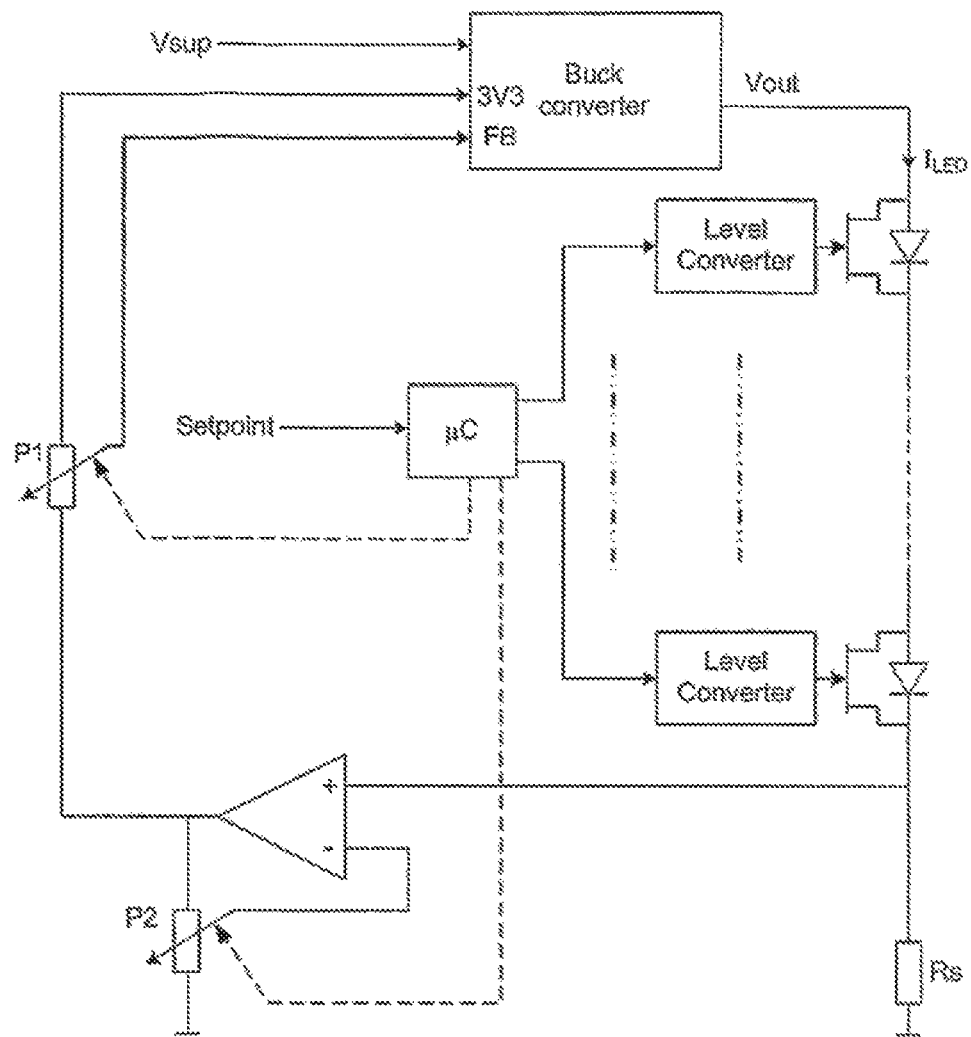

A more practical arrangement (though still a principle schematic) is provided in the highly schematic circuit diagram in FIG. 13

In the circuit depicted here, the voltage across the (possibly very low ohmic) series resistor Rs is amplified by an amplifier circuit comprising in this example an operational amplifier and potentiometer P2 as a voltage feedback network, and level-shifted by potentiometer D1 connected between an output of the amplifier circuit, a reference voltage (indicated in FIG. 13 as 3V3), Consequently, amplification and level-shifting can be set using potentiometers P1 and P2. Several op-amp topologies can be used, as will be appreciated by those skilled in the art, to optimise this circuit, for example to achieve an independent level and amplitude control, or to optimise the value of Rs. Even the behaviour of the current control loop at higher frequencies can be influenced by choosing appropriate feedback circuiting. Instead of the potentiometer P1 use could also be made of a digital to analogue converter, e.g. a multibit converter or a digital duty cycled signal filtered by a low pass filter, in order to provide a microcontroller controlled voltage or current to the feedback circuit.

Figure 14:
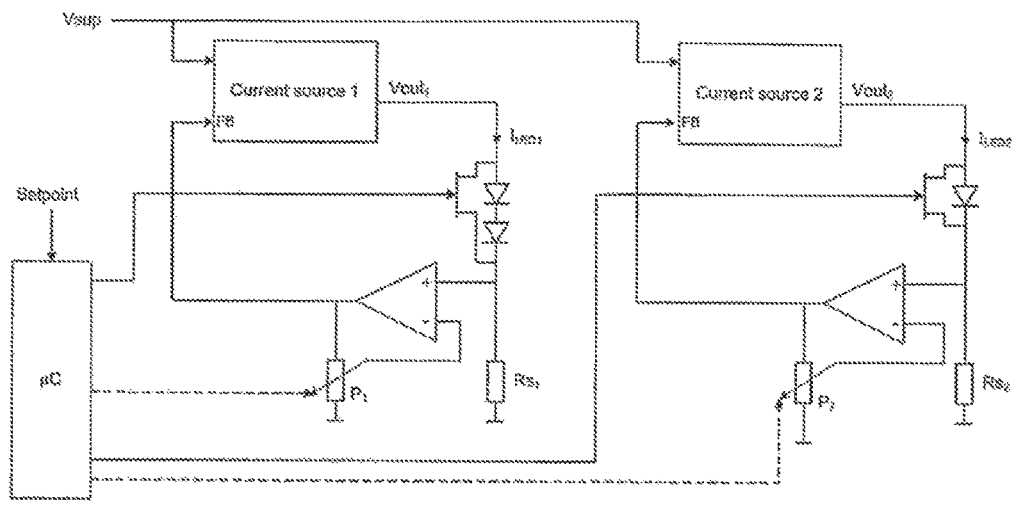

The above principles can be used for multiple LED chains, either by using complete double circuitry, by sharing the microcontroller uC, by sharing the microcontroller uC and the current source etc. An example is illustrated in the highly schematic circuit diagram of FIG. 14. In this figure, a current source is provided per group of LEDs (e.g. per LED unit), each group e.g. providing a different color, so that for each color the current and corresponding duty cycle can be set independently. Hence, a dimming of one of the colors, and a corresponding change in current, will not affect a duty cycle of the other colors, as the current for these colors is independently set. In FIG. 14, each control loop comprises a respective operational amplifier circuit to amplify the voltage across the respective series feedback resistor through which the respective power supply current flows. The respective output of the opamp circuit is connected to the respective feedback input FB of the respective converter. A voltage amplification factor of the opamp circuits is set by the respective potentiometer setting, in order to set each of the power supply currents. Thereby, the brightnesses of each of the colors can be controlled more independently then in the above configurations, as a change in the current has an effect only on the respective color, and thereby avoids the change in brightness that would instantaneously occur in the other colors, and that would have to be taken account of by altering the duty cycles of the other color(s). Especially in the situation where different colors are operated simultaneously with the same power supply current, an undesired temporary change of other colors (as observed by the human or technical observer) could occur, as it takes some time for the microcontroller to arrive at time windows in which the duty cycles of the other colors are to be amended in order to take account of the change in current.

In other words, a plurality of parallel branches may be provided, each comprising at least one LED unit, a respective switched mode power supply being provided for each of the branches, the control unit being arranged for determining a power supply current for each of the power supplies, depending on the desired output characteristic for the respective LED unit, and for providing output data for each of the power supplies.

Figure 15:
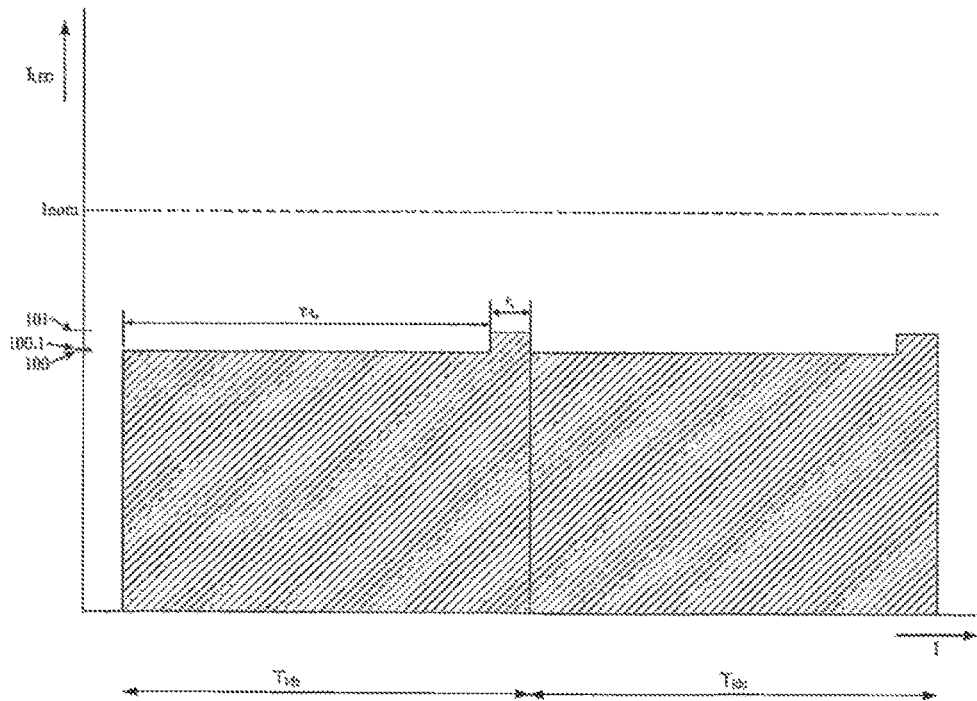
FIGS. 15, 16 and 17 depict time diagrams to illustrate still further aspects of the invention.

FIG. 15, depicts a time diagram of the LED current versus time to illustrate how even higher resolution may be provided. Thereto, "current duty cycling" is introduced. Thereto, in this example, a potentiometer with a higher resolution is used, for example an 8 bit potentiometer which provides 256 steps in the current, hence providing for example a current resolution of 1.4 mA at Inom=350 mA (350/256=1.4). In FIG. 15, the minimum step has been chosen to be 1 mA on a base setting for the current of 100 mA. By having a current of 101 mA during ta and of 100 mA during T−ta, the average current is 100.1 when ta is 10% of T. Choosing the ta/T factor or "current duty-cycle" (as opposed to the time duty-cycle disclosed in WO2006107199 A2 or a PWM-like algorithm), the average current can be fine tuned thus providing extra resolution. Thereby, resolution can thus be increased further, adding the resolutions of the time duty cycle of the parallel switches, the current level resolution and the current duty cycle resolution. Besides or instead of the increase in resolution, other effects may occur, such as a reduction of flickering, noise and/or electromagnetic interference. The additional degree of freedom provided thereby may be applied to optimize efficiency, color display, software complexity (hence required processing power of the microcontroller) or any other suitable parameter such as noise, electromagnetic interference, flickering, etc.

Figure 16:
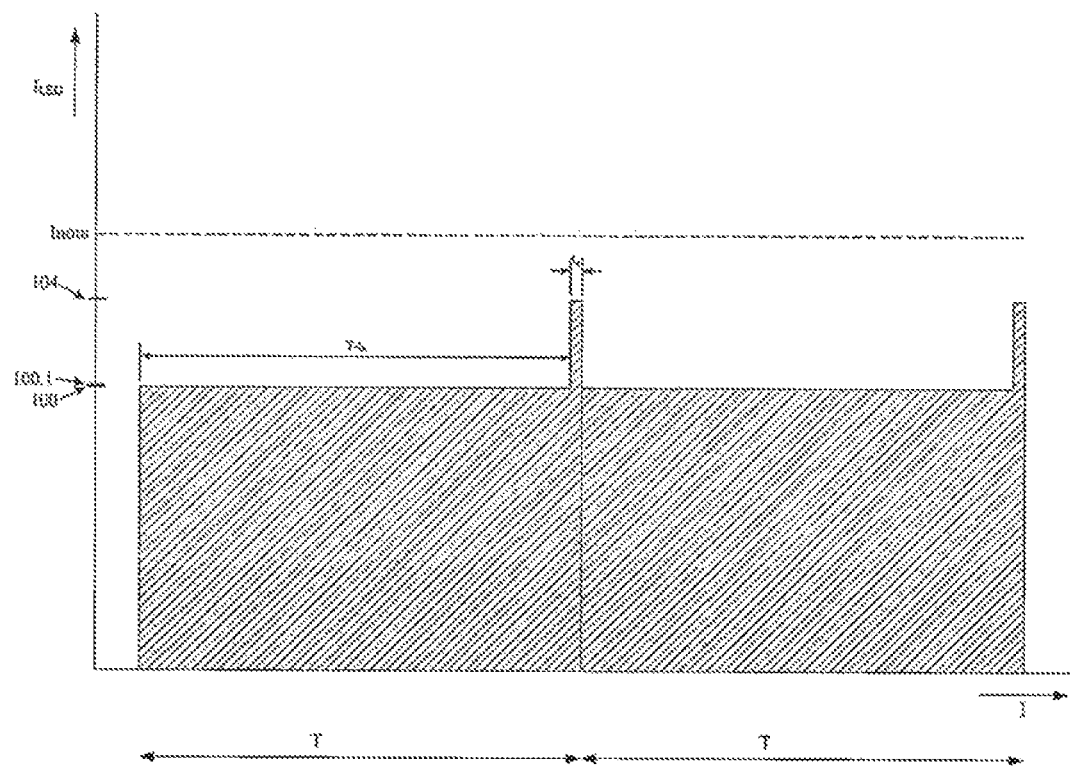

In FIG. 16, which depicts a time diagram of the LED current versus time to illustrate how such mechanism enables achieving high brightness resolutions even when Inom cannot be below a certain threshold dictated by current stability and or color shift. (In a certain range, the color shifting could even be used for fine-tuning the color setting.)

In this figure, it is shown that, given a certain average LED parameter (f.e. Brightness), different settings can be chosen to achieve that average brightness. For example, one could choose the values used in FIG. 15 (100, 101, 10%) or the values used in this figure (100, 104, 2.5%) to achieve 100.1 mA average current. A current profile such as depicted in FIG. 16 may also be applied to synchronize with an image capturing rate of a camera.

This freedom in alternative settings can be used to trade-off between avoiding visible frequencies, smoothness of the control, circuit cost and limitations, software complexity, electromagnetic interference, noise, etcetera. (For example, the higher frequency content in a 2.5% pulse is generally higher than in a 10% pulse given the same period T.)

Figure 17:
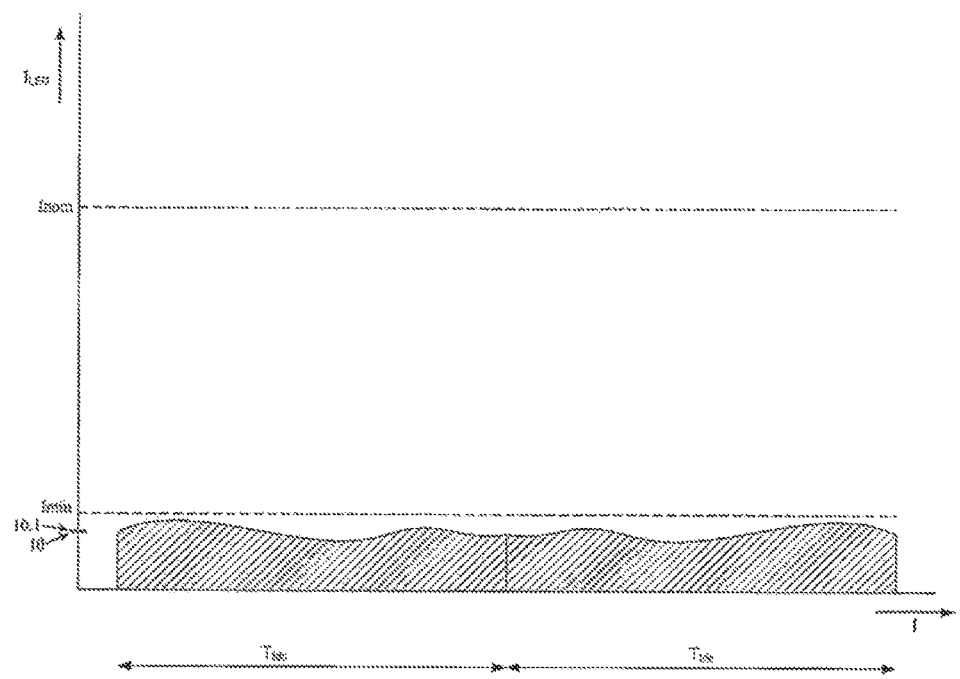
Figure 18:
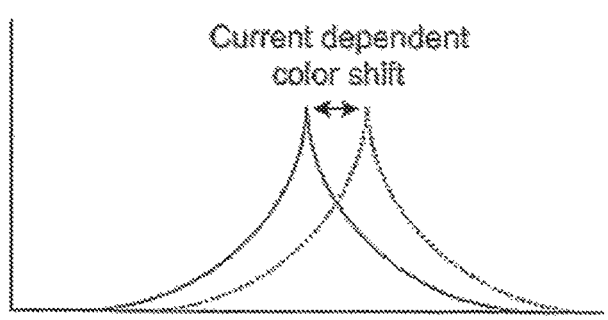
FIG. 18 depicts a spectral diagram of an LED spectrum.

FIG. 17 depicts a time diagram of the LED current versus time to illustrate effects introduced by a too low power supply current. As a first effect, a ripple on the power supply current may occur due to instability of the DC/DC converter. Secondly, LEDs exhibit a behaviour wherein at a too low current, a "knee" in the brightness curve may occur resulting in LED color spectrum shift, unpredictable behaviour or other effects. Such a color spectrum shift is illustrated in FIG. 18, schematically depicting a spectral diagram of the LED output spectrum, and showing a first and a shifted second the color spectrum for a different LED current.

Figure 19:
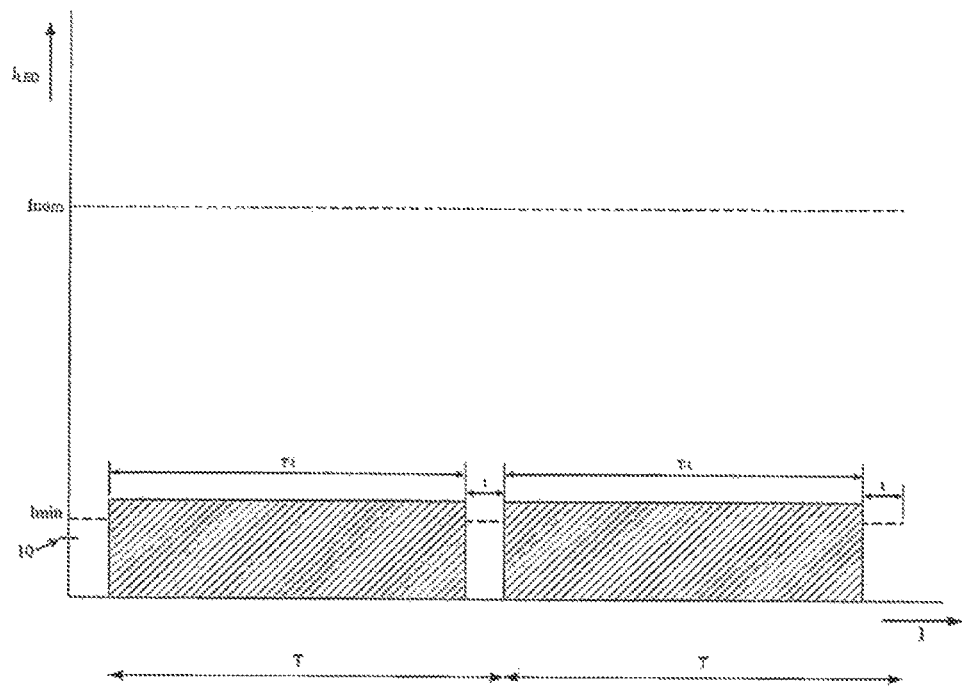
FIGS. 19 and 20 depict time diagrams to illustrate again further aspects of the invention.

FIG. 19 depicts a time diagram of LED current versus time. This figure illustrates how an average current below the minimum current can be achieved by operating the current source at a current above the minimum current for a first part T4 of the time cycle T, and switching off the current for a second part t of the time cycle T.

Thereby, possibly at the "cost" of some ultimate brightness resolution, an effective, low current may be achieved without the above mentioned color shift or instability problems as the momentary current in the duty cycle part T4 is kept above the minimum value.

The switching off may be obtained by appropriate setting the Potentiometer ratio (in a suitable feedback circuit configuration) or by closing the parallel switches during a certain part of the duty cycle time.

It is remarked that, because of the likely higher step in the current value, the importance of trading off between visible flickering and the choices for T and t increases. Given the many variables available now: duty cycle dimming, current dimming, current duty cycling, etc, many variables are available to be able to obtain a good tradeoff.

Figure 20:
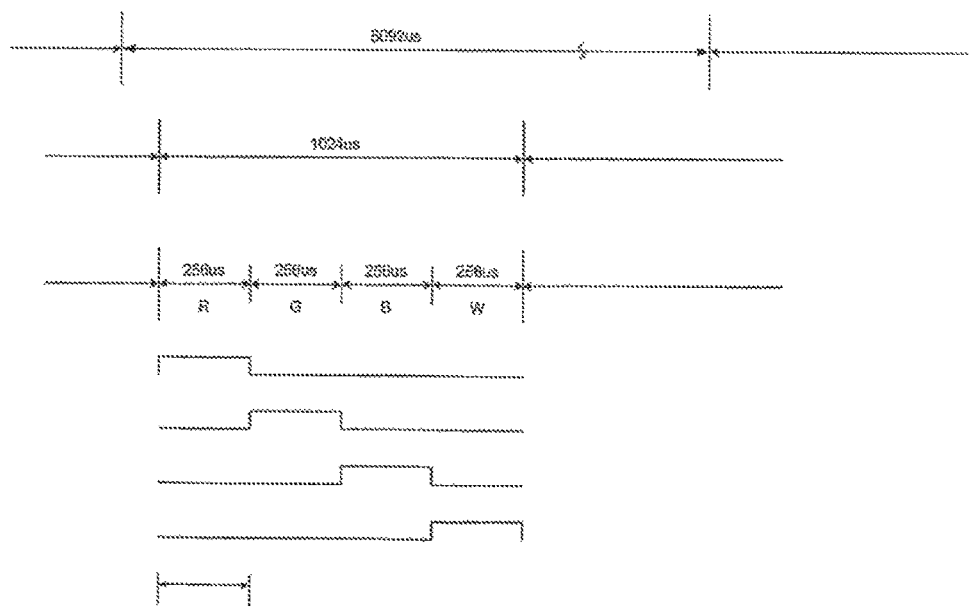

FIG. 20 depicts a time diagram of LED current versus time. In this embodiment, the current is set sufficiently large such that the time duty cycle for each color R, G, B and W does not need to be larger than 25%. Hence, the current algorithm as described previously in WO2006107199 A2 and where each color is primarily controlled in its own time quadrant (i.e. each part) of the cycle time, is greatly simplified, as it is only required to control each color in the quadrant meant for controlling that specific color thereby avoiding cross effects as in each quadrant only the appropriate color and no other color is required to be operational, In this configuration, it is even possible to change the current during each part of the cycle time to a value that matches the desired output characteristic of the respective LED unit that is to be operated in that part of the cycle time. Thus, in case R, G and B are to be operated at a low brightness level while W is to be operated at a high brightness level, the current can be set to a low value in the cycle time parts corresponding to R, G and B, thereby allowing to drive the respective LEDs at a relatively high time duty cycle within that cycle part, while in the cycle time part corresponding to W, a higher power supply current is set.

In this way, it is also possible to avoid the low frequency components (f.e. having 8096 us as base frequency in a cycling scheme of 8 time periods of 1024 microseconds each) that would arise when trying to achieve high brightness resolutions using the above referred, known algorithm at maximum $I_{nom}$. Using e.g. such known algorithm to achieve high resolution would imply for example to set the duty cycle in 7 of the 1024 us periods for Red to 128 us/128 us while setting it to 125.5/130.5 in the eight one of the 1024 us periods. This would provide a slightly lower brightness, thus achieving a high brightness resolution, however it would introduce a brightness ripple, namely a 125 Hz frequency component, as only in one of the 8 time periods of 1024 us the brightness of the LED is different.

By lowering the Inom (either by lowering the current, or by duty cycling the current in each of the time periods) and thereby keeping the LED current behaviour the same in each of the 1024 us time periods, the above described low frequency effects may be avoided.

It is remarked that, at very high brightnesses, the eyes' sensitivity becomes less and lower frequency components needed to achieve 100% brightness may have less impact.

Hence, the various embodiments as depicted and described with reference to FIGS. 6-20 allow to increase a resolution at lower brightness by altering the current of the power supply, which may be achieved accurately and cost effectively making use of e.g. a digital potentiometer, i.e. a low cost, microprocessor controllable electronic component.

The mere fact that certain measures are recited in different dependent or independent claims does not indicate that a combination of these measures cannot be used to advantage.

The invention claimed is:

1. A control unit for an LED assembly comprising a first and second LED unit, said LED units being serial connected in series, the LED assembly, in use, being powered by a switched mode power supply, the control unit being arranged to
   receive an input signal representing a desired output characteristic of the LED assembly,
   determine a first and second duty cycle of the respective first and second series-connected LED units associated with a nominal current of the switched mode power supply, for providing the desired output characteristic,
   determine the largest of the first and second duty cycles of the respective first and second series-connected LED units,
   determine a reduced current to both the first and second series-connected LED units based on at least the largest of the duty cycles,
   adjust the first and second duty cycle of respective first and second series-connected LED units based on the reduced current to both the first and second series-connected LED units or the largest of the duty cycles of the first and second series-connected LED units,
   provide output data for the LED assembly and the switched mode power supply based on the adjusted first and second duty cycles and the reduced current.

2. The control unit according to claim 1 wherein the reduced current substantially corresponds to the nominal current multiplied with the largest duty cycle.

3. The control unit according to claim 1 wherein the reduced current is based on a brightness characteristic of the LED unit.

4. The control unit according to claim 2 wherein the reduced current is based on a brightness characteristic of the LED unit.

5. A lighting system comprising an LED assembly that comprises a first and second LED unit and a control unit according to claim 1 for controlling the LED assembly.

6. The lighting system according to claim 5 further comprising a switched mode power supply for powering the LED assembly.

7. The lighting system according to claim 6 wherein the switched mode power supply comprises a buck converter.

8. A lighting system comprising an LED assembly that comprises a first and second LED unit and a control unit according to claim 7, for controlling the LED assembly.

9. The lighting system according to claim 8, further comprising a feedback circuit to feed a signal representative of the power supply current to a feedback input of the switched mode power supply, the feedback circuit comprising at least one of a digital potentiometer and a digital to analogue converter, the control unit having a control output connected to the at least one of the digital potentiometer and the digital to analogue converter, for controlling the potentiometer ratio respectively the digital to analogue converter output, thereby controlling the power supply current.

10. The lighting system according to claim 8, wherein a plurality of parallel branches is provided, each comprising at least one LED unit, a respective switched mode power supply being provided for each of the branches, the control unit being arranged for determining a power supply current for each of the power supplies, depending on the desired output characteristic for the respective LED unit, and for providing output data for each of the power supplies.

* * * * *